United States Patent [19]

Lawson

[11] 4,216,926
[45] Aug. 12, 1980

[54] LINKAGE SYSTEM FOR A TURBO FAN ENGINE THRUST REVERSER

[75] Inventor: Dale W. R. Lawson, Bonita, Calif.

[73] Assignee: Rohr Industries, Inc., Chula Vista, Calif.

[21] Appl. No.: 920,739

[22] Filed: Jun. 30, 1978

[51] Int. Cl.$^2$ .............................................. B64D 33/04
[52] U.S. Cl. .............................. 244/110 B; 60/226 A; 60/230; 239/265.27; 239/265.31
[58] Field of Search ................ 244/110 B, 12.5, 23 D, 244/53 R; 60/226 A, 229, 230; 239/265.19, 265.25, 265.27, 265.29, 265.31, 265.37

[56] References Cited

U.S. PATENT DOCUMENTS

| 2,976,681 | 3/1961 | Bennett et al. | 239/265.29 |
|---|---|---|---|
| 3,134,226 | 5/1964 | Gardner et al. | 239/265.29 X |
| 3,262,270 | 7/1966 | Beavers | 239/265.19 X |
| 3,347,467 | 10/1967 | Carl et al. | 239/265.31 |
| 3,541,794 | 11/1970 | Johnston et al. | 60/226 A |
| 3,829,020 | 8/1974 | Stearns | 239/265.29 X |

Primary Examiner—Barry L. Kelmachter
Attorney, Agent, or Firm—Patrick J. Schlesinger; Frank D. Gilliam

[57] ABSTRACT

A three link system in combination with the linear translation of a rear cowl section for non-linear rotation of each of a plurality of blocker doors for providing constant engine pressure characteristics during all positions of blocker door rotation between stowed and fully deployed. A first link is pivotally attached at one end to the engine and pivotally attached at its other end to a second link member which in turn is pivotally attached at its other end to the blocker door. A third link member is pivotally attached to the engine rearward of the first link connection and pivotally connected at its other end to the second link intermediate the end of the first link and blocker door. Actuators are provided for linear translation of the rear cowl section.

5 Claims, 15 Drawing Figures

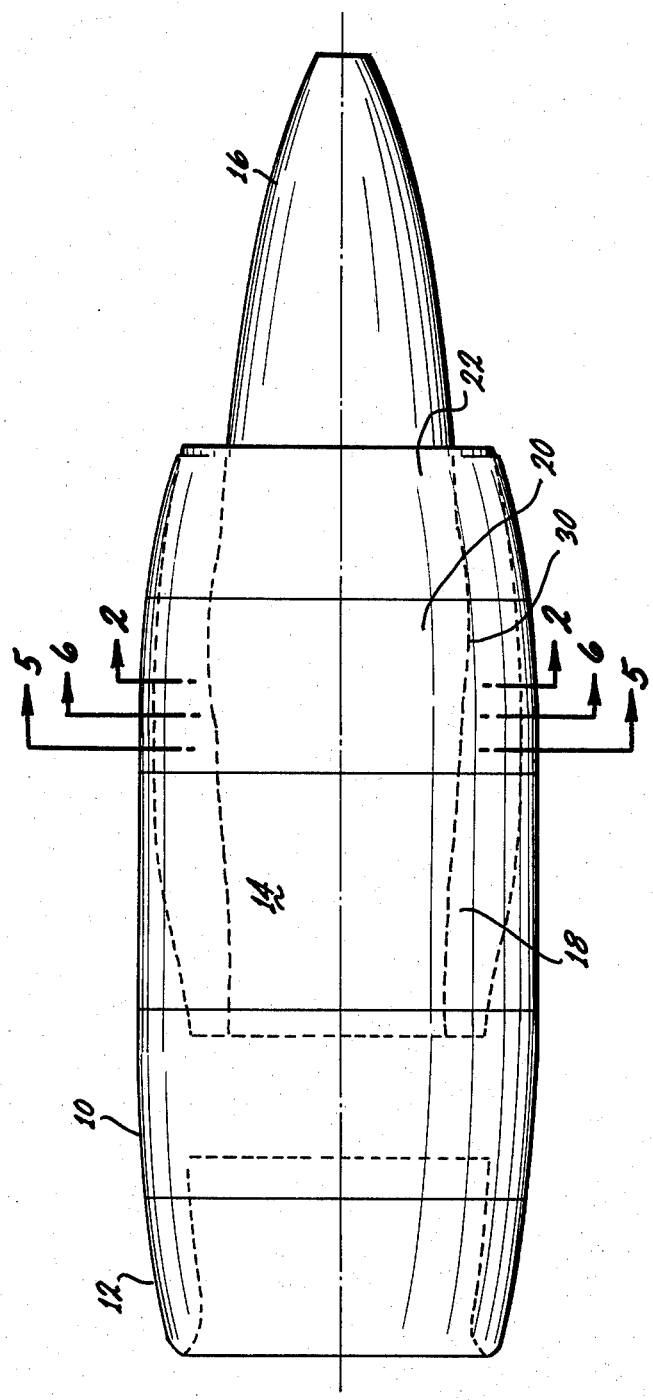
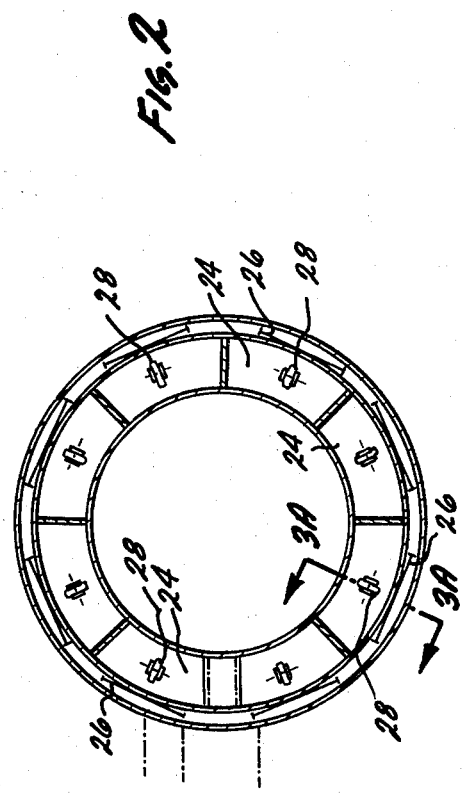

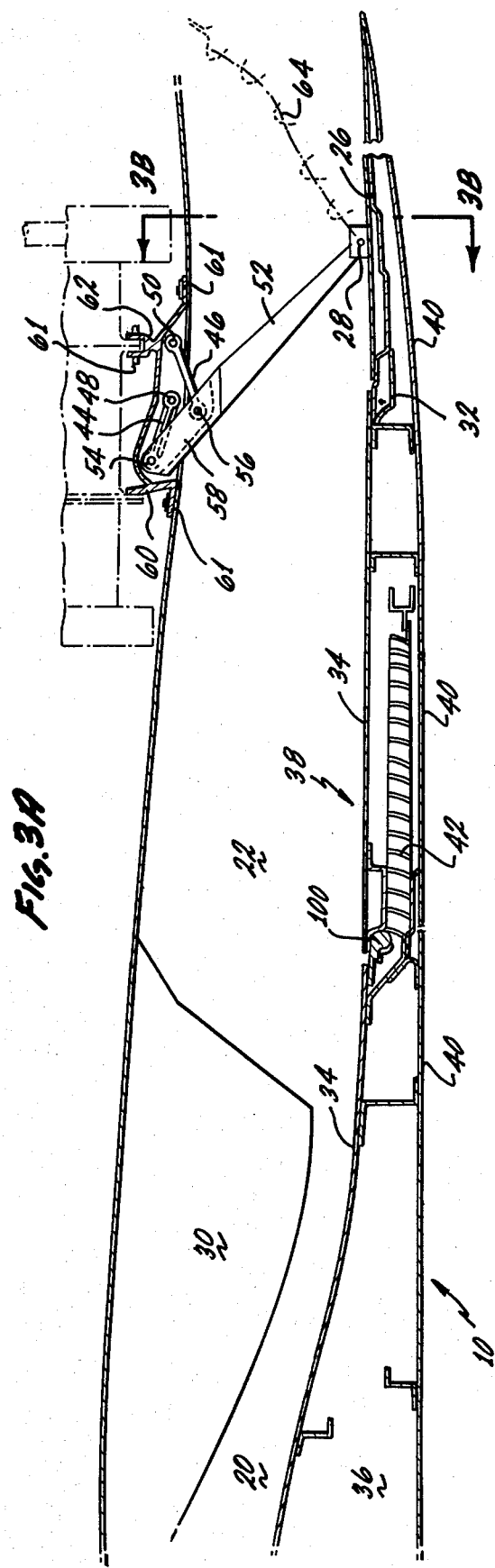
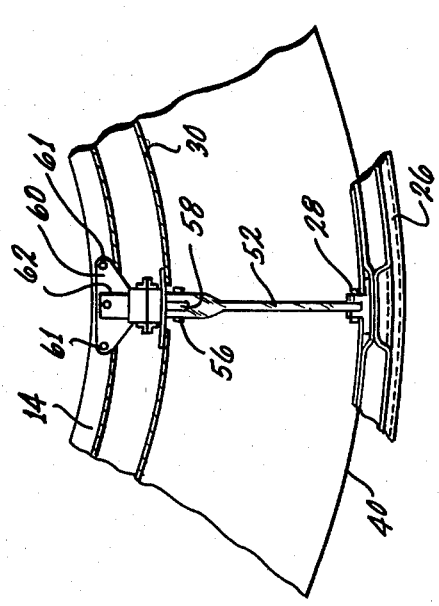

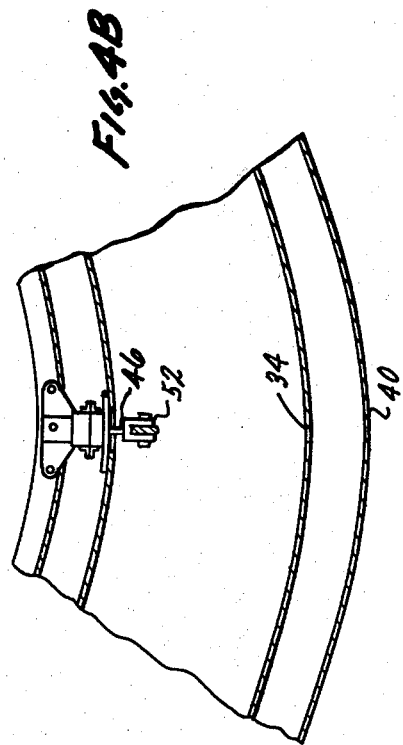
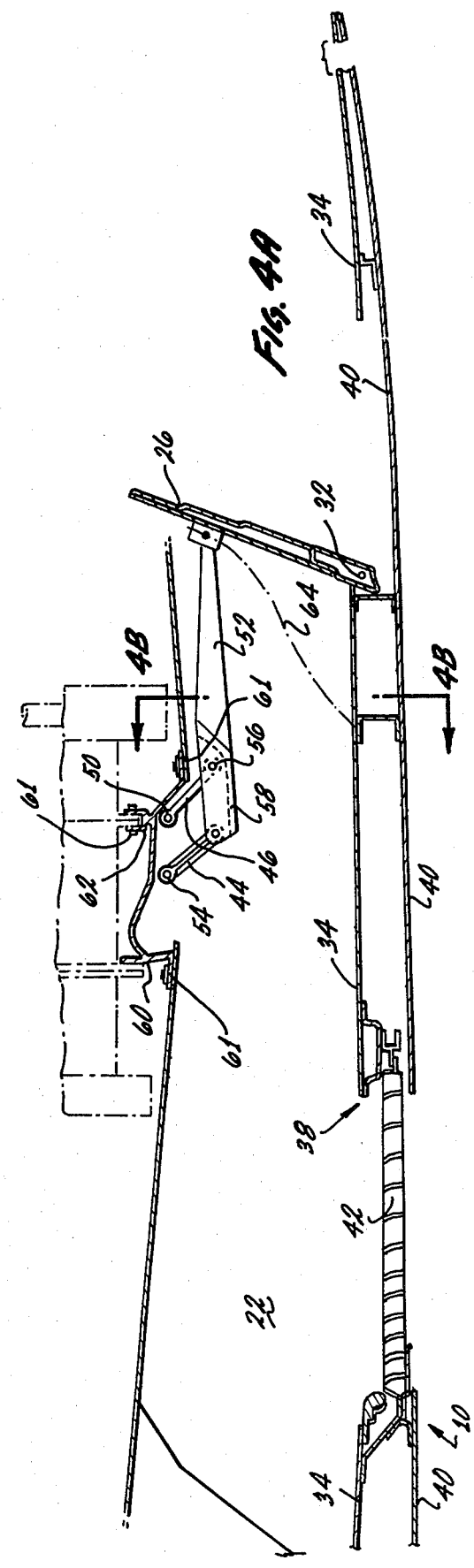

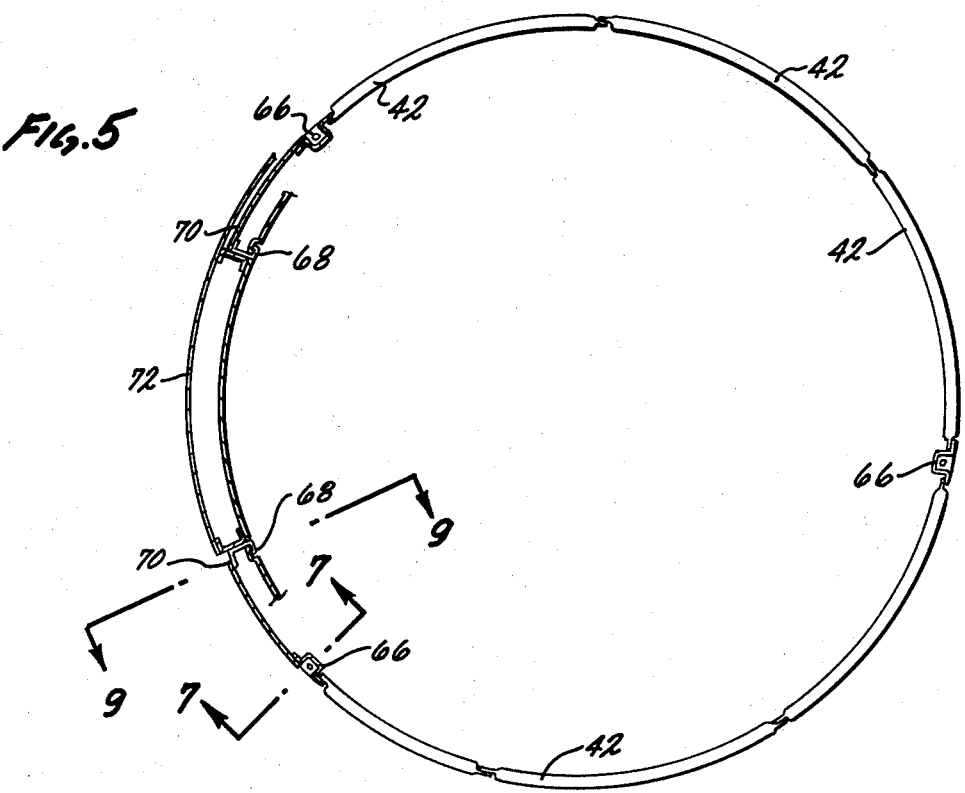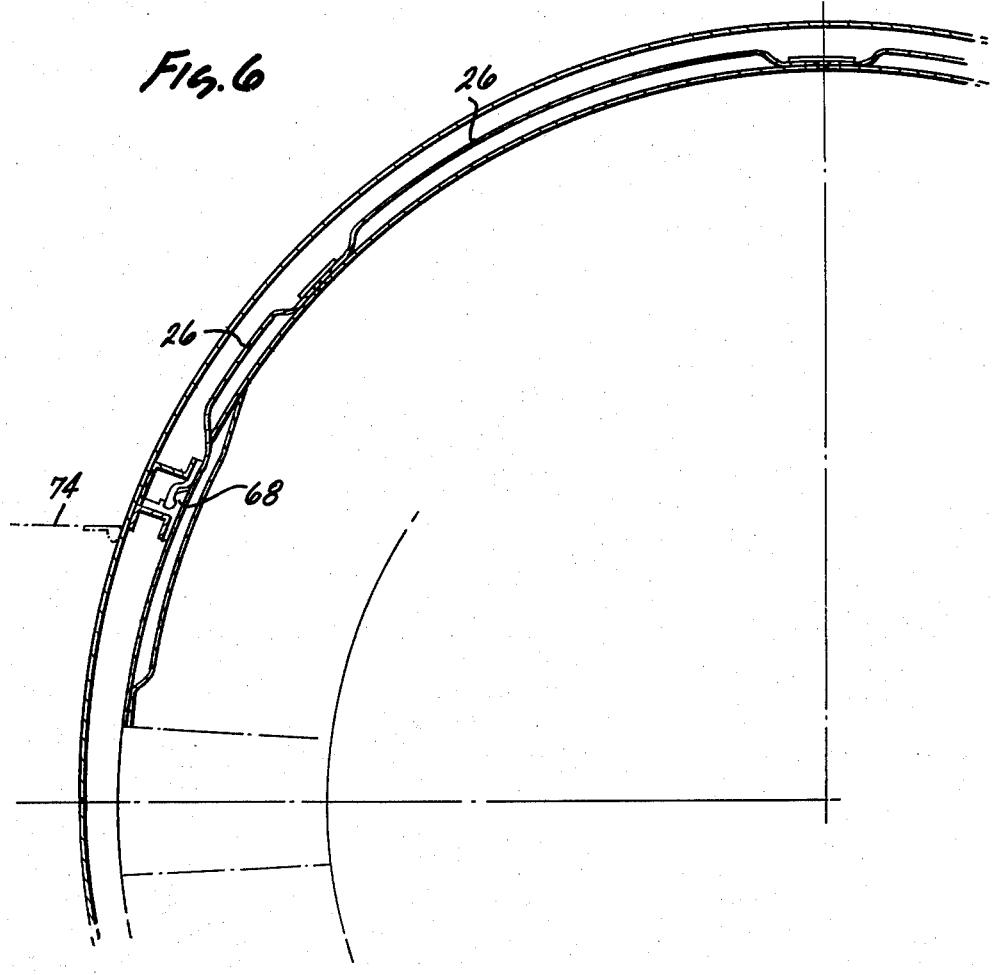

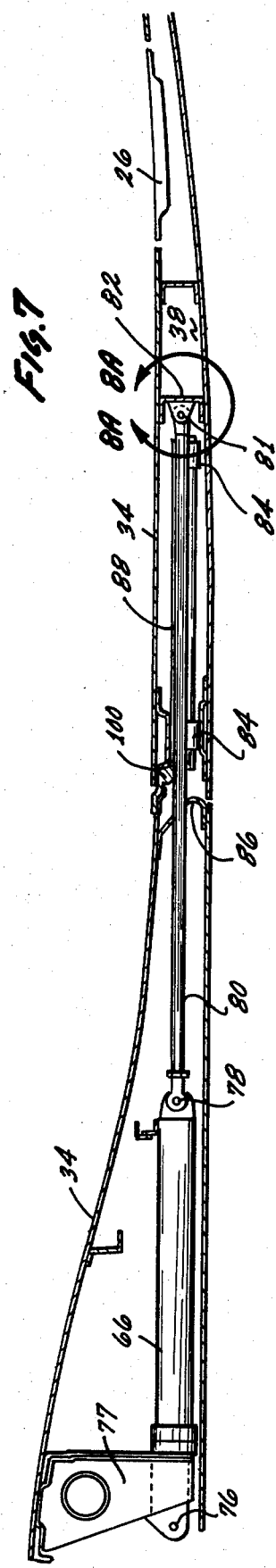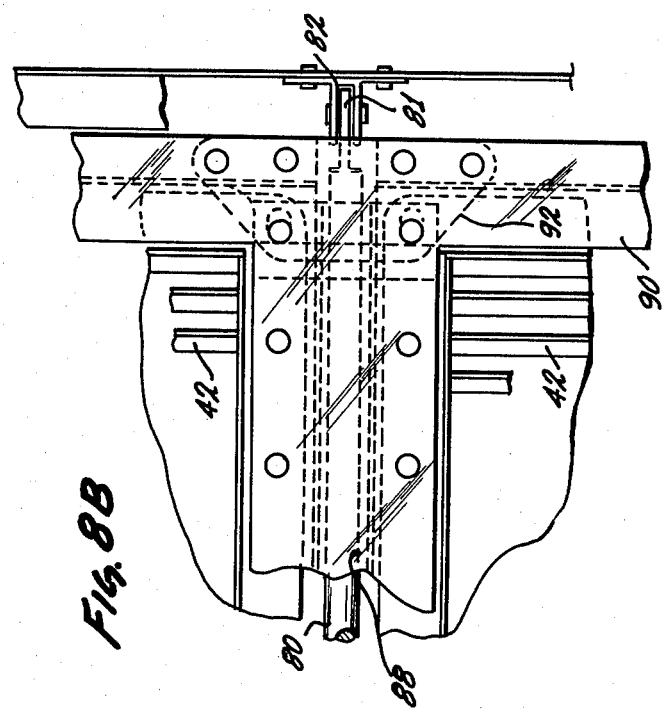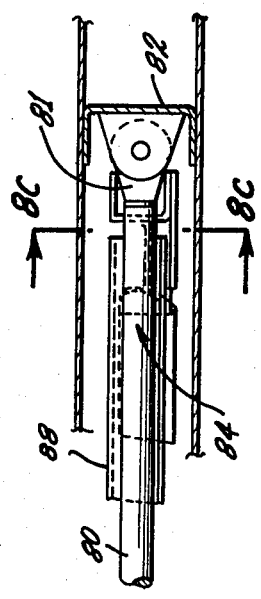

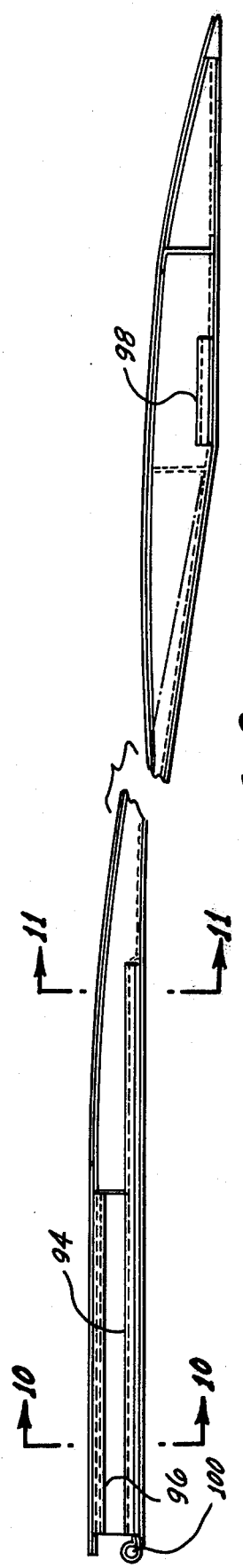
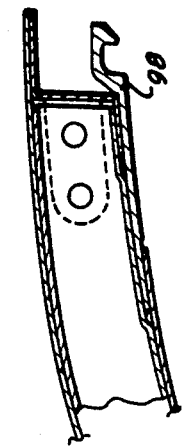
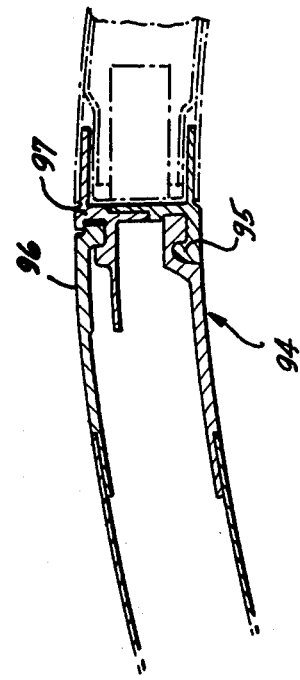

4,216,926

LINKAGE SYSTEM FOR A TURBO FAN ENGINE THRUST REVERSER

BACKGROUND OF THE INVENTION

This invention relates generally to thrust reversers for a bypass fan type jet engine and more specifically to a linkage system for simultaneously actuating each of the blocker doors utilized therein.

Various thrust reversers and linkage systems have heretofore been provided in which a translatable fan cowl portion is translated rearward to expose a ring of reversing cascades which the combined bypass air and primary engine air flows through when the rearward nozzle exit is blocked by blocker doors which are carried by the translating fan cowl. Generally, such prior art reversers have been suitable for the purpose intended; however, they have various structural and functional limitations imposed by a specific structure and combination of parts employed to accomplish the reverser function without compromising any of the aerodynamic characteristics, performance and function desired of the engine. Their restrictions have been limitations in fan duct geometry, cost, excess weight for a small aircraft, complexity of operation with resultant high maintenance expense and varying loading on the engines.

SUMMARY OF THE INVENTION

The present invention obtains the various benefits of the prior art devices with a reduction of economic cost, weight, complexity, while maintaining a substantially constant pressure loading on the engine through the various positions of the translating cowl section and reverser blocker doors positioning relating thereto. Generally stated, the apparatus of the instant invention includes an elongated nacelle section which surrounds the engine and forms therewith a combination fan and primary exhaust duct therebetween for directing the rearward flow of the engine gases. An engine nacelle is divided into a forward fixedly positioned section and a rearward translatable section, near the nacelle aft end. When the rearward section is in its stowed position, it defines a streamlined continuation of the forward portions and when deployed to its extreme rearward position, defines a peripheral outflow passage between the sections for communicating with the engine gases.

A plurality of blocker doors, are pivotally attached to the rearward translating nacelle section and translates therewith. A ring of reverser cascades are fixedly attached to the forward nacelle section and are positioned to fill the peripheral outflow passage when the rearward nacelle section is deployed rearwardly and nests between the inner and outer walls of the rearward nacelle when the rearward nacelle section is in its stowed or forward most position.

Three links connect the engine to each one of the reverser doors so as to rotate each door rearward and inward toward the engine center line in a non-linear manner as the rearward nacelle section translates in a linear manner, thus providing a rate of duct area blockage equivalent to the rate of cascade area exposure precluding engine surge and/or stall associated with area mismatch.

The mechanism is simple to construct and service, light in weight due to a minimum number of elements utilized for its construction and operation, provides a positive and effective reversal of rearward thrust, and when the actuating mechanism is in its stowed position substantially all of the device is out of the rearward gas flow path while the link members that are exposed to the rearward gas flow path are configured so as to have a minimal effect on the flow.

The principle object of this invention is to provide linkage for a simple positive acting thrust reverser that does not affect the overall performance of the operating engine during reverser deployment.

BRIEF DESCRIPTION OF THE DRAWINGS

FIG. 1 is an elevated showing of the engine, nacelle and their various associated components.

FIG. 2 is an elevated cutaway showing taken along line 2—2 of FIG. 1.

FIG. 3A is an elevated cutaway showing of the reverser link mechanism in a stowed position taken along lines 3—3 of FIG. 2 and rotated $22\frac{1}{2}°$ counterclockwise.

FIG. 3B is an end view of FIG. 3A.

FIG. 4A is the same showing as FIG. 3A taken along line 3—3 of FIG. 1 with the reverser link mechanism shown in its deployed reverser position.

FIG. 4B is an elevated cutaway view of FIG. 4A.

FIG. 5 is a view taken along line 5—5 of FIG. 1.

FIG. 6 is a quarter section of the view taken along line 6—6 of FIG. 1.

FIG. 7 is a section taken along line 7—7 of FIG. 5 and rotated 90°.

FIG. 8A is an enlarged showing of the actuator support mechanism taken at section 8 of FIG. 7.

FIG. 8B is a showing of FIG. 8A rotated 90°.

FIG. 8C is a showing of FIG. 8A taken along line 8C—8C.

FIG. 9 is a showing of the translatable sleeve taken along line 9—9 of FIG. 5.

FIG. 10 is a showing taken along line 10—10 of FIG. 9.

FIG. 11 is a showing taken along line 11—11 of FIG. 9.

Throughout the drawings and specifications, the same numerals are used to depict the identical elements or parts.

DETAILED DESCRIPTION OF THE PREFERRED EMBODIMENT

Referring now to FIG. 1, this figure depicts the various engine and engine nacelle related components and their relative placement. A fan cowl 10 surrounds the engine fan and exhaust nozzle. The fan cowl 10 forms a nose cowl 12 at its forward end around the mouth of the engine. The nose cowl 12 and the turbine 14 which includes a tail cone 16 define therebetween the foward fan duct 18, aft fan duct 20 and exhaust nozzle 22.

FIG. 2 is a showing of FIG. 1 taken along line 2—2 of FIG. 1. There is shown a plurality of blocker doors 24, eight (8) in number, shown in their deployed position. These blocker doors 24 have their hinge line 26 positioned at their center outer periphery. The blocker doors 24 have separate actuation links 28 attached in substantially the center of each door. The description and details of operation of the actuation link system will hereinafter be explained in greater detail.

Referring now to FIGS. 3A, 3B, 4A and 4B, the turbine shroud 30 is spaced inward from the inner wall 34 of cowl 10. The nozzle 22 is positioned rearward of the aft fan duct 20. The portion 36 of the cowl 10 that forms the aft fan duct is fixed in position while the aft portion 38 of the cowl 10 that forms the nozzle is translatable rearward from its FIG. 3A position. Nested between the cowl inner wall 34 and the cowl outer wall 40 and positioned around the cowl is a reversing cascade 42, which is exposed between the cowl portions when the aft section 38 is deployed rearward. The blocker doors 26 are pivotally attached at their forward edge to the translatable cowl section 38 at pivot connection 32.

A pair of link members 44, 46 are pivotally attached at one end to the turbine shroud 30 at pivot points 48, 50, respectively. The opposite ends of these links 44, 46 are pivotally attached to a longer link member 52 at pivot point 54, 56, respectively. Links 44, 46 are shown in FIG. 3A in phantom at their link 52 connected end, as these links are attached within a channel 58 at the far side of the link in the view shown. The opposite end of link 52 is attached to the blocker door at pivot point 28. As shown in FIG. 3B, the link 52 has a very narrow profile below its link connected channel 58, the purpose of which is to minimize restriction in the normal rearward flow of engine gases when the blocker doors are in their stowed position. The attachment of links 44, 46 to the engine shroud 30 is accomplished through an engine attachment bracket 60, which is fixedly secured to the shroud in any convenient manner. Typically, by a bolt and locknut 61 which has additional support from the engine turbine 14 through, for example, a bracket 62 attached to bracket 60 intermediate its shroud attachment ends. When the rear nozzle section translates rearward from its FIG. 3A stowed position to the FIG. 4A deployed position the pivot point 28 travels along line 64 and follows this same path in reverse when the rear nozzle section is again moved to its stowed position, thus providing a non linear rate of door 26, motion. FIG. 4B is the end view of FIG. 4A, taken along line 4B—4B of FIG. 4A and shows links 46 and 52 in their deployed thrust reversing position. Referring now to FIG. 5, this is a showing taken along line 5—5 of FIG. 1. The positioning of the cascade 42, the actuator assemblies 66 (three in number for the preferred embodiment) for translating the aft nozzle section rearward, the inner and outer slides 68, 70, respectively, for guiding the aft nozzle section in its rearward translation, hereinafter described in greater detail and the engine attachment section 72 are shown in their relative positions.

Referring now to FIG. 6, this showing is a second quandrant detail taken along line 6—6 of FIG. 1. This specific detail shows blocker doors 26 and the position of a typical pylon 74 for attachment of the engine to the aircraft through the engine attachment section 72 of the cowling. The blocker doors 26 adjacent either side of the pylon 74 are sized to account for the area required for the pylon attachment (the blocker door 26 below the pylon not shown). A view of inner slide 68 is shown in larger detail in this Figure.

Referring now to FIG. 7, this is a showing of a portion of the structure taking along line 7—7 of FIG. 5. An actuation assembly is shown including a linear actuator 66 that is attached at its forward end 76 to the fixed cowl structure bracket 77 and is positioned within the cowl wall structure. It should be noted that each of the actuation assemblies (see FIG. 5) are substantially the same as shown in FIG. 7. The rearward end 78 of the actuator is the translating portion. The end 78 is connected to an elongated guide rod 80 which extends rearward and is attached at its downstream end 81 to a ring 82 which is a part of the translating cowl section 38. The guide rod 80 is supported by guide rod supports 84, details of which are shown in FIGS. 8A through 8C. The guide rod 80 is supported by passing through a bulkhead 86 attached by any convenient means to the inner surface of the cowl wall of the fixedly positioned cowl section.

Referring now to FIGS. 8A through 8C in addition to FIG. 7, FIG. 8A is an enlarged showing of section 8A of FIG. 7, FIG. 8B is a showing of section 8A rotated 90° counterclockwise and FIG. 8C is a showing taken along line 8C—8C of FIG. 8A. The actuator rod 80 is shown attached at its end 81 to actuator mount fitting 82. The rod guide 84 of FIG. 8A is shown in phantom. The cascade/actuator guide support 88 is shown in section. FIG. 8B is effectively a plan sectional view of section 8 of FIG. 7.

FIGS. 8A through 8C show the various details of the actuation support and guidance mechanism for translating the rear cowl section. Specifically shown are rod 80, its attached end 81 and the end 81 attachment bracket 82. The attaching brackets 82 are fixedly attached by suitable means between the inner and outer skin of the translatable cowl section. The rod guide 84 and its support bracket 88 are shown in detail. FIG. 7B, as aforementioned, is a plan view of FIG. 8A showing a section of the cascade 42 its support ring 90 and the support ring splice 92 (far side).

Referring now specifically to FIGS. 9, 10 and 11. FIG. 9 is a section of the translatable cowl section taken along line 9—9 of FIG. 5. FIG. 10 is a showing taken along line 10—10 of FIG. 9. FIG. 11 is a showing taken along line 11—11 of FIG. 9. The rearward guiding of the translatable cowl section is provided by a series of low friction sliders. The male outer slider 96 positioned on the pylon mates with a female slider 97 carried by the translatable cowl section. A female inner slider 94 is likewise carried by the pylon and mates with a male counterpart 95 carried by the translating cowl section. Positioned at the rear portion of the translatable cowl section is a rear or aft female slider member similar to 94 which mates with a male member 95 (not shown) for the same purpose as the inner slider and its mate.

As can be seen by the various figures or combinations thereof, when the aircraft is in normal flight configuration the rear cowl section is pulled close up to the forward cowl section and sealed at its connecting point by a pressure seal member 100. When the reversing of combined gases is desired, the actuators are activated which causes the rods 80 to uniformly extend rearward translating the rear cowl section causing the reverser doors to move uniformly from their stowed to their fully deployed blocking position exposing the reverser cascade assembly. It should be obvious that reversing of the actuators causes the translated rear cowl section to return forward to its normal stowed, sealed relationship with the forward cowl section again stowing cascade assembly and the blocker doors within the rear cowl section inner walls.

It will apparent to those skilled in the art that many modifications and variations may be effected without departing from the spirit and scope of novel concepts of the present invention.

What is claimed is:

1. A pre-exit thrust reverser for reversing the rearward flow of exhaust gases from a thrust producing jet aircraft engine, said engine being enclosed by a streamlined nacelle, said nacelle having a forward fixed section and a translatable rearward section comprising:

a plurality of blocker doors pivotally attached to said translatable section and rotatable between a stowed position wherein said doors are nested in said translatable section out of the exhaust flow and a deployed position wherein said doors divert the rearward flow of engine gases through peripheral outflow passages formed between the nacelle sections when said rearward nacelle section is translated rearward;

means for rotating each of said plurality of blocker doors between said stowed and deployed positions comprising first, second and third link members, said first link member pivotally attached at one end to fixedly positioned engine structure and pivotally connected to one end of said second link member at its other end, said second link member pivotally attached at one end to one of said blocker doors, said third link member pivotally attached at one end to said fixedly positioned structure adjacent said first link attachment to said fixedly positioned structure and at its other end to said second link member intermediate the ends of the second link member; and means for translating said rear nacelle section, said second link member translates while pivoting about said first and third link members and said blocker door connection when said blocker doors rotate between said stowed and deployed positions.

2. The invention as defined in claim 1, wherein said second link member is substantially longer than said first and third link members.

3. The invention as defined in claim 1, wherein the effective area of said peripheral outflow passages and the effective area blocked by said blocker doors during translation of said translatable rearward section are balanced such that the engine maintains the same pressure loading thereon through all positions of the translatable section from stowed to fully deployed.

4. The invention as defined in claim 1, wherein said outflow passages includes cascade members positioned therein.

5. The invention as defined in claim 1, wherein the relative movements of said blocker doors and said translatable rearward section are non-linear.

* * * * *